Oct. 6, 1964   L. VADAS ETAL   3,151,647
DRUPE PITTING METHOD
Original Filed Feb. 17, 1958   3 Sheets-Sheet 1
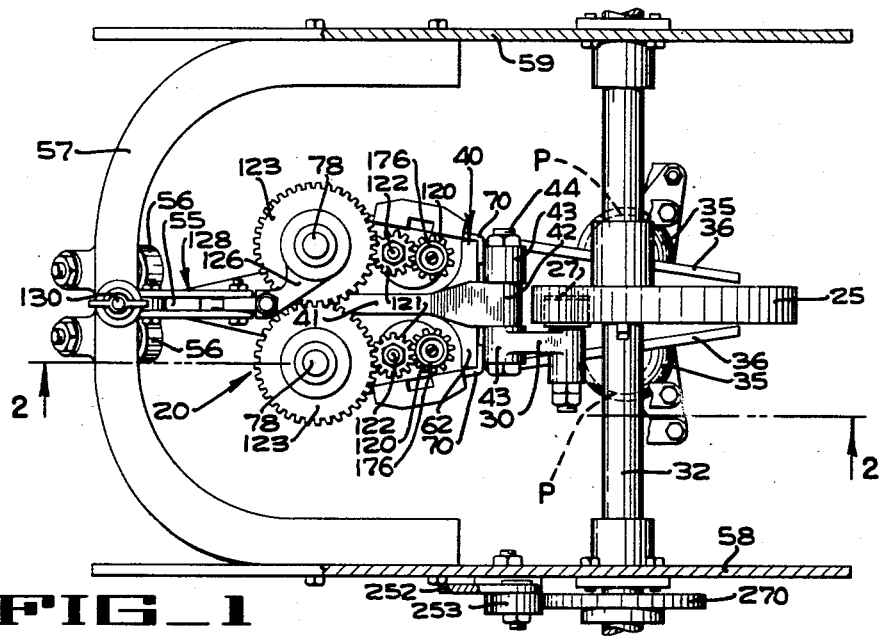
FIG_1
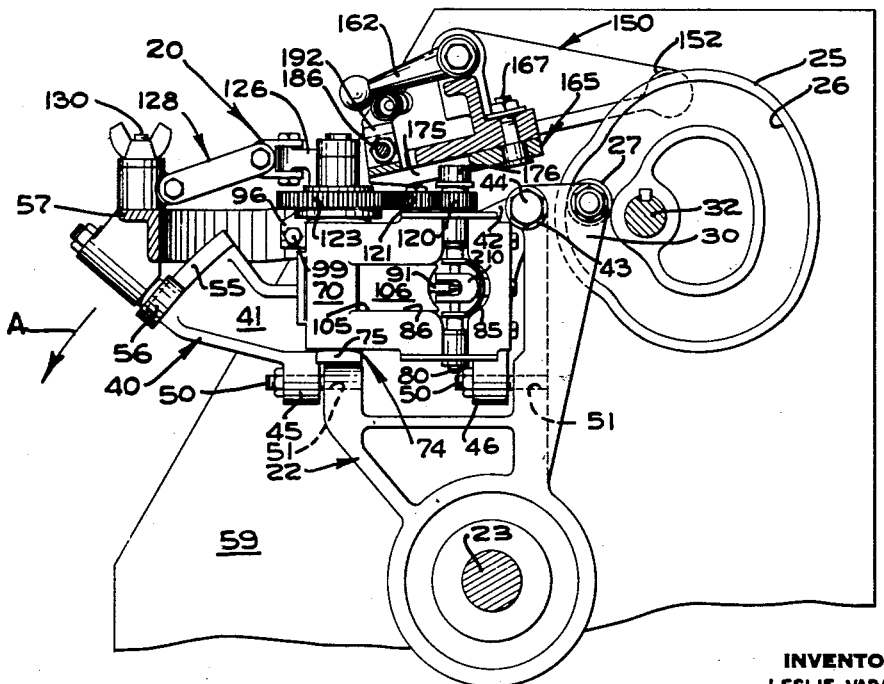
FIG_2
INVENTORS
LESLIE VADAS
PAUL C. WILBUR
BY Hans G. Hoffmeister
ATTORNEY Oct. 6, 1964     L. VADAS ETAL     3,151,647
DRUPE PITTING METHOD
Original Filed Feb. 17, 1958     3 Sheets-Sheet 2
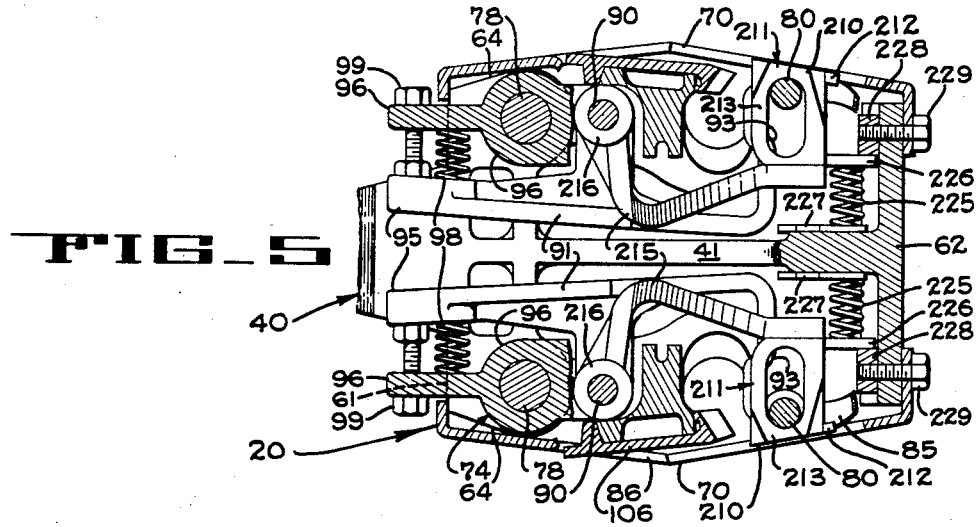
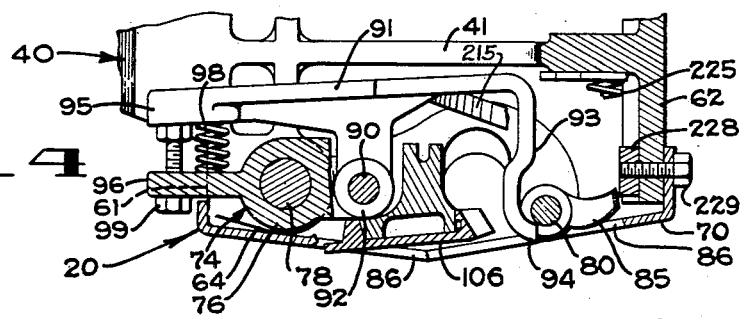
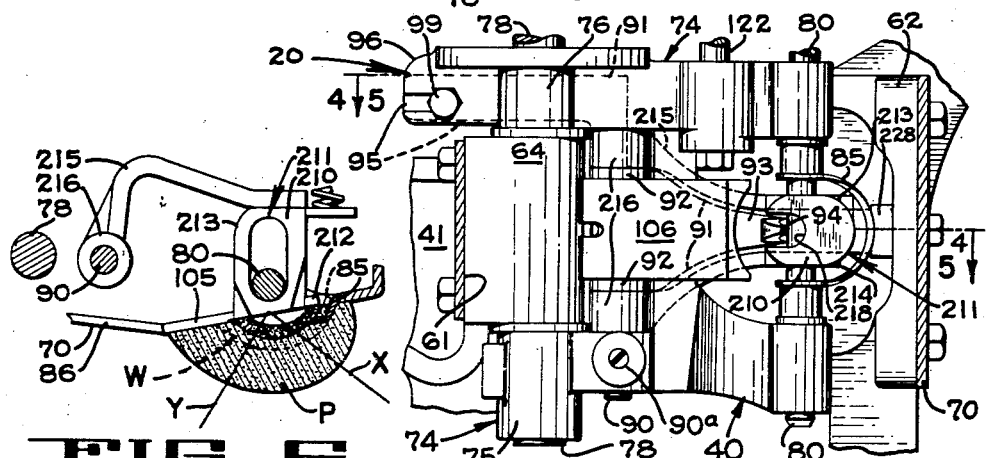
INVENTORS
LESLIE VADAS
PAUL C. WILBUR
BY *Hans G. Hoffmeister*
ATTORNEY

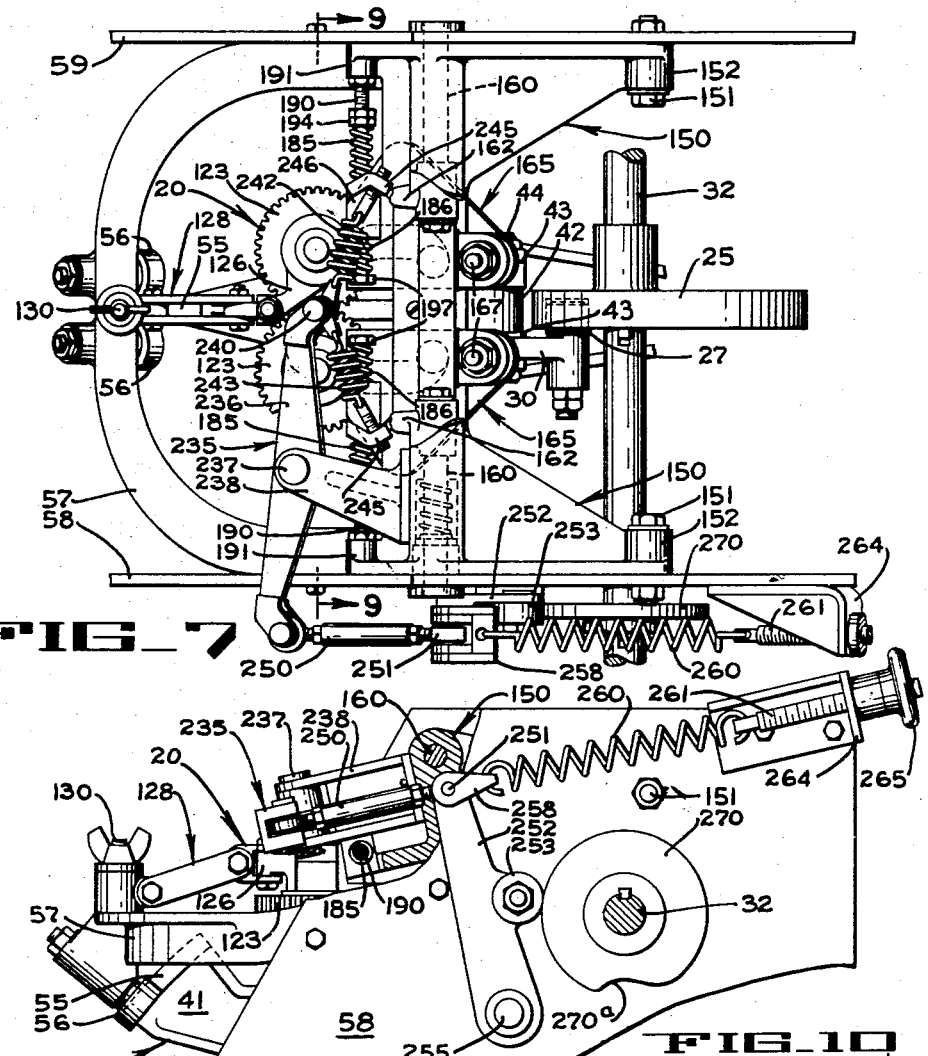

United States Patent Office 3,151,647
Patented Oct. 6, 1964

1

3,151,647
DRUPE PITTING METHOD
Leslie Vadas, Los Gatos, and Paul C. Wilbur, San Jose, Calif., assignors to FMC Corporation, San Jose, Calif., a corporation of Delaware
Original application Feb. 17, 1958, Ser. No. 715,620, now Patent No. 3,045,731, dated July 24, 1962. Divided and this application Nov. 24, 1961, Ser. No. 154,433
4 Claims. (Cl. 146—238)

This invention relates to a fruit preparation method and more particularly relates to a method for pitting peaches.

This application is a division of our pending application, Serial No. 715,620, filed February 17, 1958, now U.S. Patent No. 3,045,731, issued July 24, 1962.

The method of the present invention makes use of a pitting head which is an improvement of the head which is disclosed in U.S. Patent No. 2,581,785 to De Back et al. and is adapted to remove pit segments from halves of a peach that has been sawed in half in a previous operation. In the De Back pitting head the position of the axis of rotation of a cutting knife is established by the engagement of a pit finder with the inside of the pit half. After the axis of rotation is determined, the cutter is moved through its fixed arc about this relatively fixed axis to cut the pit half out of the peach half. Since peach pits vary in size, and since the peach pit may not be divided in equal sections when the peach is cut into halves, the De Back knife must be set so that it will clear the largest pit half that may be presented to it. Accordingly, when small pit halves are encountered, an excess amount of flesh is cut away with the pit half. In the present invention, this disadvantage is overcome by providing a mechanism that positively shifts the axis of an oscillating knife inwardly of the pitting head so that the knife is positively moved into engagement with the pit half during the pitting operation whereby the knife performs its cutting operation close to the pit surface regardless of the size of the pit half.

An object is to provide a novel method of pitting peaches.

Other and further objects and advantages of the present invention will become apparent from the following detailed description taken in connection with the accompanying drawings in which:

FIG. 1 is a diagrammatic plan of a pitting head employed in carrying out the method of the present invention shown mounted on a portion of a pitting machine, with parts removed.

FIG. 2 is a vertical section taken on lines 2—2 of FIG. 1.

FIG. 3 is a fragmentary side elevation of the head with the outer side plate broken away and only its end portion shown in section.

FIG. 4 is a horizontal section taken on line 4—4 of FIG. 3 with the auxiliary support plate broken away.

FIG. 5 is a horizontal section taken on line 5—5 of FIG. 3.

FIG. 6 is a schematic illustration of the operation of the pitting mechanism used in performing the method of the present invention.

FIG. 7 is a fragmentary plan of the portion of the pitting machine in which the pitting head is mounted, said plan particularly showing the auxiliary control mechanism of the present invention.

FIG. 8 is a side elevation, partly broken away, of the part of the machine shown in FIG. 7.

FIG. 9 is a vertical section taken on line 9—9 of FIG. 7.

FIG. 10 is a fragmentary bottom plan taken looking in the direction of arrows 10—10 of FIG. 9 and particularly showing the configuration of the cam slots.

The method of the present invention includes an improved pitting head 20 (FIGS. 1 and 2) which is particularly adapted for use with the pitting machine disclosed in U.S. Patent No. 2,376,526 to Albert R. Thompson, the construction and arrangement being such that the present pitting head 20 may be substituted for the head which was disclosed in said patented machine, without substantially altering the other parts of the machine.

In general, the head 20 is mounted on a cradle 22 which is secured to a shaft 23 that is pivotally mounted in the machine. During operation, the cradle and the head are pivoted forwardly in the direction of arrow A (FIG. 2) during the pitting of a peach half, and are then swung rearwardly to this initial rear position to receive the next peach half to be pitted. The head 20 is oscillated by means of a cam 25 having a cam track 26 adapted to receive a roller 27 rotatably mounted on an upper rear portion 30 of the cradle. The cam 25 is keyed to a shaft 32 which is rotated in timed relation with the other members of the machine, so that the head 20 is oscillated in timed relation with feed cups 35 (FIG. 1), which are driven by the machine and are arranged to move the peach halves P upwardly and forwardly along guide plates 36, and slide the halves onto opposite sides of the pitting head while the head is in its rearward position.

The head 20 includes a body portion 40 (FIG. 1) having a central longitudinal partition 41, and an upper rear ear 42 which is secured between a pair of spaced bosses 43 on the cradle 22 by a bolt 44. At its lower edge, the body portion 40 has two bosses 45 and 46 (FIG. 2) which carry positioning pins 50 adapted to fit in sockets 51 formed in the cradle. It will thus be seen that the pitting head is removably connected by a three point support to the cradle 22.

At its forward end, the body portion of the head is provided with an arcuate track 55 which has its center of curvature coincident with the center of shaft 23. The track 55 is engaged on its opposite sides by rollers 56 supported by an overhead support bracket 57, which is mounted in fixed position between side plates 58 and 59 (FIG. 1) of the machine.

The body portion 40 (FIG. 3) of the head carries a laterally directed cross member 62 at its rearward end. Spaced forwardly from the cross member 62, the body portion is provided with a pair of laterally disposed journals 64 (FIG. 5) having vertical bores. The mechanism mounted on one side of the central partition 41 is identical to the mechanism on the other side of the partition but oppositely disposed. On each side of the head, a fruit support plate 70 is secured to the body portion 40, extending between a front wall portion 61 of the body and the rear cross member 62. A generally H-shaped knife support lever or carrier 74 (FIG. 5) has two vertically spaced bosses 75 and 76 (FIG. 3) journalled for rotation on a shaft 78 that is supported for rotation in the vertical journal 64 of the body portion. Each lever 74 extends rearwardly in the head (FIG. 4) between the central partition 41 and the corresponding fruit support plate 70, and near its rearward end the lever 74 rotatably journals a pitting knife shaft 80 which has a vertical axis. A U-shaped cutter in the form of an open loop knife 85 (FIG. 5) is secured by its legs to the shaft 80 so that oscillation of the shaft 80 about its axis causes oscillation of the knife. The fruit support plate 70 is provided with an opening 86 (FIG. 4) of sufficient size to permit the knife to swing therethrough.

A pit finder shaft 90 (FIG. 5) is secured by a setscrew 90a in the knife support lever 74 in parallel relation to the shafts 78 and 80. The pit finder shaft 90 supports a pit finder lever 91 (FIG. 4) for oscillating movement, said lever including a hub 92 rotatable on shaft 90 and a rear arm 93 that projects rearwardly and laterally outwardly of the head in such a manner as to pass alongside and project beyond the pitting knife shaft 80 so that it may be moved outwardly through the opening 86 in the plate 70. The arm 93 has a pointed outer end portion 94. The pit finder lever 91 also includes a forward arm 95, which is offset upwardly (FIG. 3) to clear the journal 64 and extends forwardly between the partition 41 (FIG. 4) and the journal end of the knife support lever 74. The end portion of the arm 95 is disposed in spaced relation to a lug 96 formed on the lever 74. A spring 98, disposed between the arm 95 and the lug 96, is arranged to urge them apart. An adjustment bolt 99 is anchored in the arm 95 and passes freely through an opening in lug 96, and is arranged to limit the movement of the arm 95 and the lug 96 away from each other. By means of this arrangement the spacing between the path of movement of the pitting knife 85 and the pit finder point 94 may be adjusted so that there will be a predetermined distance between the pit finder point and the knife as it moves along its arcuate path during the pitting operation.

The forward edge of the opening 86 in the support plate 70 is cut away to form a recess 105 (FIG. 2) adapted to receive a ramp plate 106 which is rigidly connected to or formed integrally on the knife support lever 74 in such a manner that, when the lever 74 is in its retracted position (FIG. 4) relatively close to the partition 41, the ramp 106 is offset inwardly from the surface of the fruit support plate 70. When the lever 74 is moved outwardly away from the partition 41, the ramp 106 moves to a position approximately flush with the normal surface of the fruit support plate.

Each pitting knife shaft 80 projects upwardly from the head and is provided with a gear 120 (FIG. 1) which is keyed to shaft 80 and meshes with an idler gear 121 that is rotatably journalled on a short shaft 122 (FIG. 3) that is secured in the lever 74. Each idler gear 121 meshes with a drive gear 123 rotatably supported on shaft 78, and the two drive gears 123 mesh with each other so that the two pitting knives are arranged to be operated simultaneously. One of the drive gears 123 is provided with a drive lever 126, which is connected by a suitable linkage 128 to a pivot post 130 mounted on the overhead support bracket 57. The several gears are so arranged that when the pitting head is moved forwardly in unison with the peach feeding mechanism and a peach half overlies each fruit support plate 70, the shafts 80 are rotated and the pitting knifes 85 are caused to swing, from the position shown in FIG. 3, outwardly through openings 86 to make arcuate cuts around the pit halves in the peach halves.

It will be observed that each pitting knife must be initially retracted to a position within the head during movement of a peach half into position on the associated support plate 70 and again retracted during removal of the pitted peach half. The mechanism for controlling the lateral movement of the pit finders and the pitting knives comprises a bridge 150 (FIG. 7) which is pivotally mounted by bolts 151 between the side plates 58 and 59 of the machine. The bridge is substantially U-shaped in plan with pivot journals 152 at its extremities which coact with the side plates so that the bridge may be swung upwardly and away from the pitting head when it is desired to service the head. The bridge extends directly over the head and is retained in closely spaced relation thereto by means of latch pins 160 each of which is controlled by a hand operated lever 162.

Two pitting knife control cams 165 (FIGS. 9 and 10) are supported from the under surface of the bridge 150. Each cam is in the form of a substantially triangular plate (FIGS. 7 and 10) pivotally supported at its rearward apex by a pivot pin 167. Retainer plates 169, 170 and 171 (FIGS. 9 and 10) retain the control cam against the underside of the bridge but permit oscillating movement of the cams. The underside of each control cam (FIG. 10) is provided with a cam slot 175 which extends generally in a longitudinal direction relative to the pitting head. Each slot overlies one of the pitting knife shafts 80 and is adapted to receive a cam follower roller 176 (FIG. 1) which is rotatably mounted on the upper end of each of the knife shafts.

Each cam slot 175 (FIG. 10) includes a laterally outwardly sloping initial portion 175c which curves into a forwardly directed portion 175b, and this portion in turn curves into a laterally inwardly directed portion 175a. It will be evident from FIG. 7 that, as the pitting head moves forwardly under the stationary cams 165, the pitting knife shafts, which journal the cam rollers 176, are first moved outwardly, as the rollers 176 move along portion 175c of the cam slot 175, to bring the pit finders into contact with the pit. Then, while each roller moves along the straight portion 175b of the associated cam, the knife shaft is not moved laterally but is retained in a relatively fixed position during the pitting operation. As each follower 176 rides into portion 175a of the cam slot, the knife shaft is moved inwardly to a retracted position in the head.

Although each control cam is mounted for oscillating movement about a pivot pin 167, it is held in substantially fixed position on the bridge during normal pitting operation by means of two springs 185 and 186 (FIG. 9) which are disposed on an adjustment bolt 190 that has one end threaded in a boss 191 of the bridge and passes freely through a relatively large opening in a lug 192 integrally formed on the top surface of the cam plate. The spring 185 is disposed between a nut 194 on the bolt 190 and the lug 192 while the spring 186 is disposed between a head 197 formed on the bolt 190 and the lug 192. It will be apparent that, by adjusting the nut 194 on the bolt, a desired initial position of the oscillatable cam plate can be obtained. Further, the force required to compress the springs will determine the amount of force necessary to cause the cam plate to be swung in either direction about its pivot pin 167. It will be evident that if a pit finder point 94 contacts a pit before the roller follower 176 reaches the straight portion 175b of the cam plate, the cam plate will be forced to pivot inwardly of the head, about pin 167, against the resistance of the springs to permit the follower 176 to move into the straight portion 175b of the cam slot.

A feature of the present invention is the provision of an auxiliary fruit support plate 210 (FIG. 5) which resiliently supports the peach half from the pit side of the peach half. This auxiliary fruit support plate comprises a cage-like member 211 (FIG. 3) consisting of a forward plate 212 integrally formed on two inwardly projecting spaced arms 213 and 214. Each of the arms 213 and 214 is welded to a rearwardly extending yoked lever 215 that has a hub 216 rotatably supported on shaft 90. The forward plate 212 has a recess 218 (FIG. 3) adapted to permit passage therethrough of the pit finder, and the arms 213 and 214 are slotted (FIG. 5) to receive the knife shaft 80.

The auxiliary support plate 210 is urged outwardly of the head by a spring 225 which is disposed between a tab 226 formed on the lever 215 and an abutment plate 227 secured to partition 41. The abutment plate 227 also acts as a stop which the lever contacts when it is moved inwardly of the head. The outermost position of the auxiliary fruit support plate is determined by the engagement of the tab 226 on the lever 215 with an adjustable stop 228 which may be adjustably secured to the body member 62 by a capscrew 229.

At a predetermined time after the knife has started to cut around the pit half, the knife shaft 80 is shifted radially inwardly of the head to positively bring the knife into engagement with the pit surface. This movement is effected by means of a cam-controlled linkage 235 (FIGS. 7 and 8) comprising a lever 236 pivotally mounted at 237 on a bracket 238 which is secured to and projects forwardly from the bridge 150. The lever 236 has a pin 240 at one end which is connected to two tension springs 242 and 243, each of which is anchored on an upstanding ear 245 of an arm 246 (FIG. 9) that is formed integral with the lug 192 on one of the control cams 165. The other end of the lever 236 is pivotally connected to a link 250 (FIG. 7) which in turn is pivotally connected at 251 to a lever 252 (FIG. 8) which carries a cam follower roller 253. The lever 252 is pivoted at its lower end on the side plate 58 of the machine by a pin 255. At its upper end, the lever 252 pivotally supports a yoke 258 which engages one hooked end of a spring 260 which is connected at its other end to an adjustment member 261. The member 261 has a threaded shank projecting through an opening in a stationary flange plate 264. The tension of the spring may be varied by means of a hand wheel 265 threaded on the shank of the member 261 and bearing against the plate 264. The cam follower 253 rides on the peripheral camming surface of a cam 270 that is keyed to shaft 32 on which cam 25 (FIG. 1) is also keyed.

It will be seen in FIG. 8 that, when the cam follower 253 rides into the recessed portion 270a of the cam 270, the spring 260 swings lever 252 clockwise about pin 255, causing lever 236 to be pivoted counterclockwise (FIG. 7) to move the pin 240 in a direction away from the bridge 150. This movement of the lever exerts a pull on springs 242 and 243, and this pull tends to swing the control cams 165 inwardly of the head about their pivot pins 167. Since the cam rollers 176 on the upper ends of the knife shafts 80 are, at this time disposed in the relatively straight portions 175b of the slots in the control cams, the knife shafts 80 will also be swung inwardly, and the knives will be positively moved into engagement with the surface of the pit half.

It is to be particularly noted that during the pitting operation, each pit half is suported on one of the spring-loaded auxiliary support plates 210. Accordingly, each knife is spring-urged against one side of the pit while the auxiliary support plate 210 is spring-urged against the other side of the pit. This balance spring arrangement makes it possible for the knife to follow closely along the surface of the pit.

It will also be evident that, since each control cam 165 is pulled inwardly by the lever 236 through a separate spring, each knife can accommodate itself to the associated pit surface, independently of the movement of the other. Therefore, even if the pit halves are not of equal size, each knife will be able to contact the surface of the associated pit half.

It will be noted that the fruit positioning cup 35 exerts a pressure on the associated peach half tending to bulge the central portion of the peach half inwardly of the head. The spring-urged support plate 210 will resist inward movement of the peach half and, when the pitting movement of the cutter is completed and the inward pressure of the cup 35 is relaxed, the plate 210 will move any bulged portion out of the aperture in the support plate so that there will be no contact of the bulged portion with the edge of the support plate when the cup slides the peach half off the plate at the end of the forward movement of the pitting head.

Another feature of the present invention is the special design of the cam track 26 in cam 25 whereby the pitting head is so timed with the movement of the feed cups 35 that the knife is moved into the peach half at a point spaced approximately 1/8" rearwardly of the rear end of the pit half as sen in FIG. 6. The head is then accelerated to bring the knife into contact with the rear edge of the pit half. The auxiliary cam 270 comes into operation when the knife has moved along its arcuate path to a point indicated by the radial line X. The knife shaft 80 is then urged inwardly of the head to shift the axis of rotation of the knife and resiliently urge the knife against the surface of the pit half. When the knife reaches the point indicated by radial line Y, the auxiliary cam 270 pivots the associated linkage in a direction to release the knife shaft 80 and permit the knife to move along a path slightly spaced from the fragile end of the pit half.

It is to be noted in FIG. 6 that without the special design of the cam slot 26 and the action of the auxiliary cam 270, the knife would follow the path W indicated in dotted lines in FIG. 6, with a corresponding waste of peach flesh.

Accordingly, the present invention provides a novel method of pitting peach halves which includes the steps of moving the knife into the peach half at a predetermined distance rearwardly of the rear end of the pit half, bodily shifting the knife forwardly relative to the peach half to bring the knife against the rear end of the pit half, and then shifting the axis of rotation of the knife away from the peach half to cause the knife to closely follow the pit surface for a predetermined distance. The particular design of the cams 25 and 270 and the novel linkage associated with cam 270 makes possible this efficient, economical pitting of peach halves.

It will be understood that modifications and variations may be effected without departing from the scope of the novel concepts of the invention.

Having thus described the invention, what we claim as new and desire to protect by Letters Patent is:

1. In a method of cutting an exposed section of pit from its cavity in a segment of fruit flesh while minimizing the amount of flesh remaining adhered to said pit section after said cutting is completed, said pit section having a convex surface facing into said cavity and first and second ends respectively adjacent to first and second ends of said segment, the steps of initially cutting into said flesh segment between said first ends of said pit section and flesh segment and lengthwise of said section toward said second ends; continuing said lengthwise cutting and simultaneously therewith, cutting inwardly toward said convex surface; again cutting lengthwise of said section toward said second ends but closer to said convex surface than said initial cutting; and finally cutting out of said segment between said second ends of said pit section and flesh segment whereby said segment and section are separated.

2. The method of claim 1 wherein said first end of said pit section is a relatively strong end of said section whereas said second end of said pit section is a relatively fragile end of said pit section, and wherein said final cutting is spaced from said fragile second end to avoid breakage thereof by the cutting action.

3. In a method of moving a knife having a cutting edge so as to remove an exposed section of pit from its cavity in a segment of fruit flesh while minimizing the amount of flesh remaining adhered to said pit section after it has been removed, said pit section having a convex surface facing into said cavity and first and second ends respectively adjacent to first and second ends of the flesh segment, the steps of moving the cutting edge of said knife into said flesh segment between said first ends of said flesh segment and pit section and toward said second ends along a path extending lengthwise of said pit section and spaced from the said convex surface thereof, maintaining said knife entirely spaced from said pit section during said movement of the cutting edge along said path, moving the cutting edge of said knife inwardly of said path and into engagement with said convex surface while continuing to move said knife toward said second ends, moving said cutting edge along and in contact with said convex surface toward said second ends from the position of first contact of said edge with said surface to a second position of pit contact spaced from said second ends, and thence moving said knife from said second position out of said segment while maintaining the entire knife spaced from said second end of the pit section, said movement of the knife and its cutting edge being made continuously and without interruption from its entry into said segment to its exit from said segment.

4. The method of claim 3 including the step of resiliently urging said edge against said convex surface only during said movement of the edge along and in contact with said convex surface.

References Cited in the file of this patent

UNITED STATES PATENTS

| | | |
|---|---|---|
| 2,329,212 | Nawman | Sept. 14, 1943 |
| 2,489,612 | Besag et al. | Nov. 29, 1949 |
| 2,775,278 | Anderson | Dec. 25, 1956 |